US010124642B2

(12) United States Patent
Marking

(10) Patent No.: US 10,124,642 B2
(45) Date of Patent: *Nov. 13, 2018

(54) METHODS AND APPARATUS FOR MANAGING PRESSURIZED GAS IN FLUID DAMPERS

(71) Applicant: Fox Factory, Inc., Scotts Valley, CA (US)

(72) Inventor: John Marking, El Cajon, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/136,148

(22) Filed: Apr. 22, 2016

(65) Prior Publication Data

US 2016/0236530 A1 Aug. 18, 2016

Related U.S. Application Data

(63) Continuation of application No. 14/331,133, filed on Jul. 14, 2014, now Pat. No. 9,341,226, which is a
(Continued)

(51) Int. Cl.
*F16F 9/43* (2006.01)
*F16F 9/24* (2006.01)
(Continued)

(52) U.S. Cl.
CPC ............... *B60G 13/08* (2013.01); *F16F 9/06* (2013.01); *F16F 9/062* (2013.01); *F16F 9/064* (2013.01); *F16F 9/43* (2013.01); *Y10T 29/49863* (2015.01)

(58) Field of Classification Search
CPC ........ F16F 9/06; F16F 9/54; F16F 9/145; F16F 9/10; F16F 9/43; F16F 9/066; F16F 9/068;
(Continued)

(56) References Cited

U.S. PATENT DOCUMENTS 4,593,890 A * 6/1986 van der Laarse ......... F16F 9/06
188/1.11 R
4,844,428 A * 7/1989 Margolis ............ B60G 17/0416
188/318
(Continued)

FOREIGN PATENT DOCUMENTS

JP 55082833 A * 6/1980 ................ F16F 9/06
JP 59083846 A * 5/1984 ............... F16F 9/363
JP 04372410 A * 12/1992 ........... B60G 13/003

*Primary Examiner* — Robert A. Siconolfi
*Assistant Examiner* — San Aung

(57) ABSTRACT

A method and apparatus for a shock absorber having a damping fluid compensation chamber with a gas charge. In one aspect, a partition separates a first chamber portion from a second chamber portion, wherein the first portion of the chamber is at a first initial gas pressure and the second portion of the chamber is at a second initial pressure. A valve separates the first and second chamber portions and opening the valve comingles the first and second chamber portions so that the combined chamber portions are at a third pressure. In another aspect, a piston disposed through a wall is in pressure communication with the gas charge and is biased inwardly toward a pressure of the charge, whereby an indicator is movable by the piston in response to the pressure.

16 Claims, 5 Drawing Sheets

Related U.S. Application Data continuation of application No. 12/900,687, filed on Oct. 8, 2010, now Pat. No. 8,807,300.

(60) Provisional application No. 61/267,646, filed on Dec. 8, 2009, provisional application No. 61/254,947, filed on Oct. 26, 2009.

(51) Int. Cl.
*F16F 9/32* (2006.01)
*B23P 11/02* (2006.01)
*B60G 13/08* (2006.01)
*F16F 9/06* (2006.01)

(58) Field of Classification Search
CPC .... F16F 9/065; F16F 9/08; F16F 13/00; F16F 2230/10; B60G 2202/154; B60G 15/12; B60G 17/08; Y10T 29/49863
USPC .............. 188/1.11 R, 314, 315, 316, 322.13, 188/322.15, 322.22, 277, 285, 287, 322, 188/19, 322.21, 266.2; 267/64.25, 64.28
See application file for complete search history.

(56) References Cited

U.S. PATENT DOCUMENTS

| | | | |
|---|---|---|---|
| 5,400,880 A * | 3/1995 | Ryan | ...................... B60G 15/00 188/314 |
| 6,698,730 B2 | 3/2004 | Easter | |
| 7,124,865 B2 * | 10/2006 | Turner | ................. B60B 17/002 188/322.2 |
| 7,607,522 B2 | 10/2009 | Nygren et al. | |
| 7,703,585 B2 | 4/2010 | Fox | |
| 7,870,936 B2 * | 1/2011 | Shipman | ................... F16F 9/56 188/285 |
| 8,464,850 B2 | 6/2013 | Fox | |
| 8,807,300 B2 * | 8/2014 | Marking | ................. F16F 9/064 138/32 |
| 9,341,226 B2 * | 5/2016 | Marking | ................. F16F 9/064 |
| 2002/0053493 A1 * | 5/2002 | Sintorn | ................... F16F 9/064 188/282.9 |
| 2003/0067103 A1 | 4/2003 | Easter | |
| 2003/0094341 A1 * | 5/2003 | Lemieux | ................. F16F 9/064 188/316 |
| 2003/0234144 A1 | 12/2003 | Fox | |
| 2005/0173213 A1 * | 8/2005 | Coquet | ..................... F16F 9/44 188/322.13 |
| 2006/0102440 A1 * | 5/2006 | Nygren | ................... B25B 13/48 188/314 |
| 2008/0041681 A1 * | 2/2008 | Shipman | ................ B62K 25/08 188/319.2 |
| 2008/0116622 A1 * | 5/2008 | Fox | ........................ B62K 25/08 267/64.28 |

\* cited by examiner

METHODS AND APPARATUS FOR MANAGING PRESSURIZED GAS IN FLUID DAMPERS

CROSS-REFERENCE TO RELATED APPLICATIONS

This application claims priority to and is a continuation of the co-pending U.S. patent application Ser. No. 14/331,133 filed on Jul. 14, 2014, entitled "METHODS AND APPARATUS FOR MANAGING PRESSURIZED GAS IN FLUID DAMPERS" by John Marking, assigned to the assignee of the present application, and is hereby incorporated by reference in its entirety.

The application Ser. No. 14/331,133 claims priority to and is a continuation of the U.S. patent application Ser. No. 12/900,687, now issued U.S. Pat. No. 8,807,300, filed on Oct. 8, 2010, entitled "METHODS AND APPARATUS FOR MANAGING PRESSURIZED GAS IN FLUID DAMPERS" by John Marking, assigned to the assignee of the present application, and is hereby incorporated by reference in its entirety.

The application Ser. No. 12/900,687 claims the benefit of and claims priority to the U.S. Provisional Patent Application Ser. No. 61/267,646, filed Dec. 8, 2009, entitled "VISUAL GAS PRESSURE INDICATOR" by John Marking, assigned to the assignee of the present application, and is hereby incorporated by reference in its entirety.

The application Ser. No. 12/900,687 claims the benefit of and claims priority to the U.S. Provisional patent application Ser. No. 61/254,947, filed Oct. 26, 2009, entitled "SELF CHARGING SHOCK" by John Marking, assigned to the assignee of the present application, and is hereby incorporated by reference in its entirety.

BACKGROUND OF THE INVENTION

Field of the Invention

The present invention relates to shock absorbers for vehicles. More particularly, the invention relates to fluid dampers. More particularly still, the invention relates to methods and apparatus for controlling and managing pressurized gas used in a fluid damper reservoir.

Description of the Related Art

Suspension systems (e.g. "shock absorber") for vehicles, including motor vehicles and bicycles, include a spring portion and a damper portion. The spring portion creates resistance to a shock absorber's compression, and that resistance may increase non-linearly as the spring is compressed. In some instances, springs are coil springs or leaf springs and in other instances they are gas springs that produce a non-linear compression curve due to the compression of a given quantity of gas. Dampers, on the other hand, produce resistance as a piston moves through substantially incompressible fluid, making the operation of the damper dependent upon shock absorber compression velocity rather than the stroke position of the suspension system. A fluid damper typically involves a chamber having a damping fluid disposed therein and a piston and rod which together move in and out of the fluid chamber as the suspension system compresses and rebounds. The piston is equipped with fluid passages, usually including shims, which restrict the flow of fluid through the piston from one side of the chamber to the other and provide the damping effect as the piston and rod move into and out of the chamber.

When the piston and rod enter the fluid chamber, a volume of fluid equal to the volume of the incoming piston rod must be displaced from the chamber. In order to compensate for the reduction in space for the fluid, a reservoir is used which typically consists of a floating piston that operates with a volume of gas behind the piston. As the volume in the fluid chamber decreases, the floating piston moves against the volume of gas which thereby becomes compressed. In this manner, the reservoir volume available for the damping fluid can increase and decrease during each respective compression and retraction stroke of the shock absorber. A reservoir can be integrally included as a part of the damper chamber or can be a separate chamber, usually adjacent the main damper chamber.

In some instances, especially for larger capacity dampers used with motor vehicles, it is not unusual to have the gas volume of the remote reservoir pressurized for use to 200 psi. Due to the physical size and weight of the damper and the tendency of the charged gas reservoir to extend the piston and rod, these shocks can be difficult to mount when the gas volume is charged with pressure, due to an individual's inability to compress the rod and piston by hand. This problem has been addressed by providing the damper to the customer in a pre-charged condition, but with a strap or other temporary restraining member retaining the damper in a partially compressed position. After the damper is installed on a vehicle, the strap is removed to permit the damper to extend to its fully extended position.

Because the gas pressure of the gas volume in a damper affects the overall performance of the damper, maintaining appropriate gas pressure is important. In some instances, however, the mere act of checking the pressure results in a gas volume which is under-pressurized due to the small gas volume and the necessity of utilizing at least a small part of the gas while checking the pressure. Constant checking only exacerbates the issue and often results in an underpressured reservoir.

What is needed is a way to facilitate the installation of dampers on vehicles while ensuring that the damper will be provided with the appropriate gas pressure in the reservoir portion. Additionally, there is a need for a safe and easy way to determine whether a gas volume in a damper is appropriately charged with the desired amount of gas pressure.

SUMMARY OF THE INVENTION

The present invention generally comprises a damper having a damping fluid compensation chamber, or reservoir, with a gas charge. In one aspect, a partition separates a first chamber portion from a second chamber portion, wherein the first portion of the chamber is at a first initial gas pressure and the second portion of the chamber is at a second initial pressure. A valve or frangible member separates the first and second chamber portions and opening the valve comingles the first and second chamber portions so that the combined chamber portions are at a third pressure based on their respective initial pressures and volumes. In another aspect, a piston disposed through a wall of the shock absorber is in pressure communication with a reservoir gas chamber and is biased inwardly toward an interior volume of the chamber, whereby an indicator is movable by the piston (or comprises the piston) in response to a gas pressure in the chamber.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
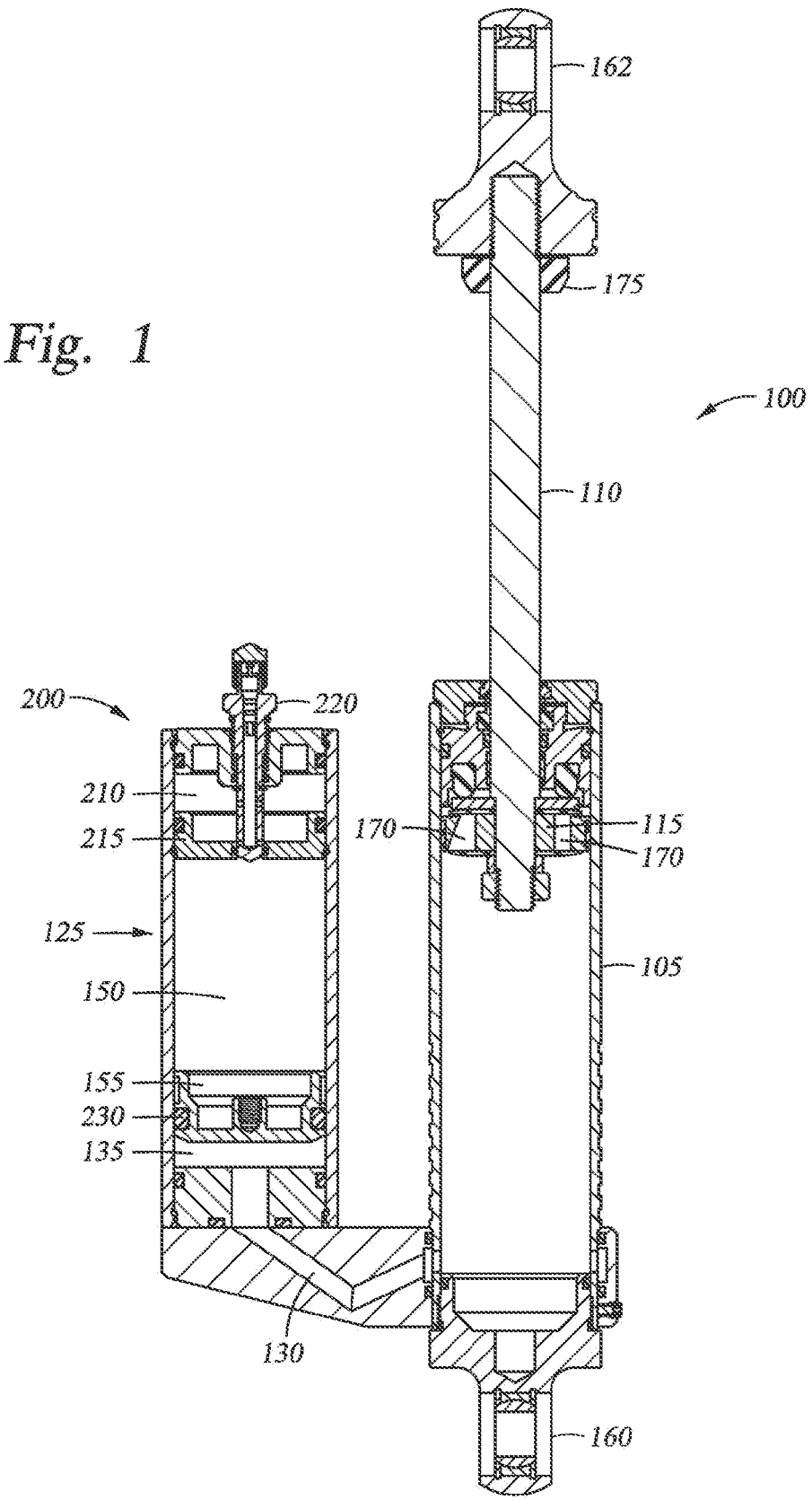
FIG. 1 is a section view of a damper with a remote reservoir.

FIG. 1 is a section view of a fluid damper 100 embodiment, typically for a motor vehicle. The main parts for the damper include a fluid chamber 105 and a rod 110 with a piston 115 disposed at the end thereof for extending into the fluid chamber 105, thereby dividing the chamber into compression and rebound portions respectively on opposite sides of the piston 115. In FIG. 1, the rod and piston are shown in their fully extended position as they would appear at the beginning of a compression stroke (e.g. an uncompressed damper). The damper also includes a remote reservoir 125 or compensation chamber, constructed and arranged to receive damping fluid via a communication, or fluid flow, path 130. The remote reservoir is divided into a damping fluid 135 and a compressed gas portion 150 with the two portions separated by a floating piston 155 which, as described herein, is sealed with an O-ring 230 and moves against the volume of compressed gas in the gas portion 150 as fluid displaced from the fluid chamber 105 during a compression stroke of the damper moves into the fluid portion 135 of the remote reservoir 125.

In one embodiment the damper of FIG. 1 is often installed as part of a vehicle suspension system and a mounting lug or "eyelet" 160 formed at an end of Inc fluid chamber is connected to Inc vehicle frame while another mounting lug 162 disposed at an end of the rod is attached to the vehicle wheel (not shown). As the damper operates, the piston 115 and rod 110 move into and out of the fluid chamber 105, metering fluid through communication paths 170 and shims in the piston. An annular bumper 175 is disposed at an end of the piston rod 110 to prevent the assembly 100 from reaching a bottom-out condition.

In addition to the components of the damper described, the damper of FIG. 1 includes a pre-charge assembly 200 disposed at an end of the remote reservoir 125 (note that if the reservoir were in line with the damper so to would be such a pre-charge assembly). The pre-charge assembly includes a pre-charge gas portion 210 which is separated from the compressed gas portion 150 of the remote reservoir 125 by a partition 215. The assembly 200 also includes a fill/communication valve 220 constructed and arranged to permit initial charging of the pre-charge gas portion and to allow a user to permit fluid communication between the pre-charge portion 210 and the compressed gas portion 150.

Figure 2:
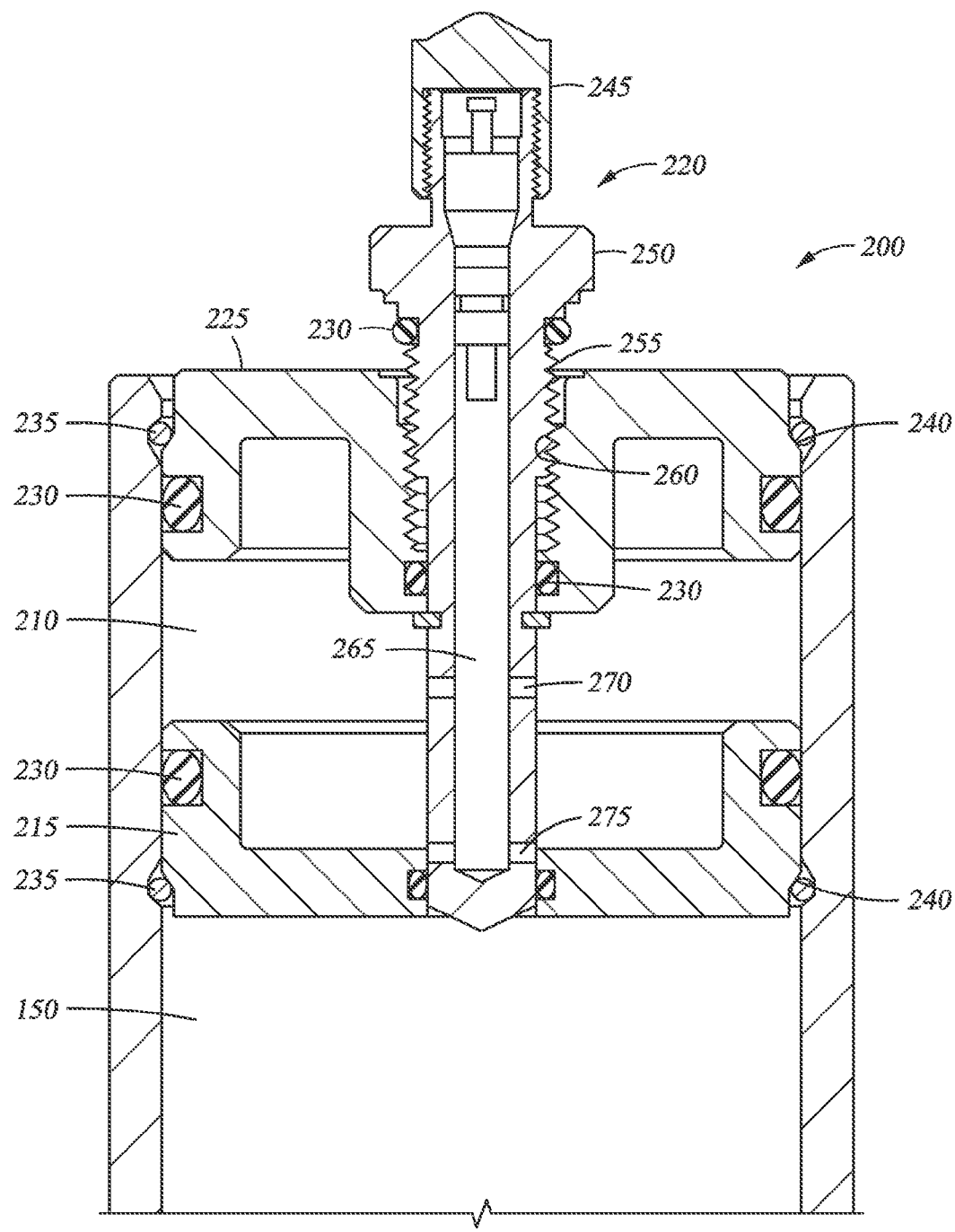
FIG. 2 is a section view of the remote reservoir of FIG. 1 showing pre-charge assembly.

FIG. 2 is a section view of the pre-charge assembly 200 of FIG. 1. In the embodiments of FIGS. 1 and 2, the assembly 200 is located at one end of the remote reservoir 125 of the damper 100 and the pre-charge portion 210 houses a volume of pressurized gas which is retained between an end cap 225 and partition 215. Both the end cap and the partition are sealed with O-rings 230 or other suitable seals and each is retained axially by structural rings 235 acting against shoulders 240 formed in the cap 225 and partition 215 to maintain structural integrity against the highly pressurized gas (e.g. 600-800 psi in one embodiment) that will be housed in the pre-charge portion 210. In one embodiment, the compressed gas portion 150 is isolated from the pre-charge portion and gas pressure in portion 150 is limited to atmospheric pressure. The gas pressure in portion 150 may be any suitable low pressure, preferably such that the net extension force acting on rod 110 due to the pressure may be overcome manually.

Disposed in the pre-charge assembly is a fill/communication valve 220 intended to facilitate initial filling of the pre-charge portion 210 and to provide selective communication between the pre-charge portion 210 and the compressed gas portion 150 of the remote reservoir. Thereafter, the valve 220 provides a way to further fill or adjust the combined gas portion of the reservoir with pressurized gas. The valve is shown with a protective cap 245 threaded onto an end thereof.

The fill/communication valve 220 includes a central member 250 having external threads 255 which interact with internal threads 260 formed in the end cap 225, whereby rotation of the central member 250 provides axial movement (corresponding to the thread pitch) of the communication valve 220 relative to the end cap 225. The central member 250 includes a seal 230 at each end of the threaded portions 255, 260. In one embodiment the cap gland interior seal 230 engages a relatively smooth outer diameter of the central member 250 and seals initial pressure of the pre-charge portion 210 prior to movement of the central member 250 and corresponding gas commingling between the pre-charge portion 210 and the compressed gas portion 150. An interior portion 265 of the central member is hollow and a first communication path including apertures 270 is formed between the hollow portion of the central member 250 and the pre-charge portion 210 therearound. For example, in FIG. 2, gas communication exists only between the pre-charge portion and the central member (permitting the pre-charge portion to be initially charged without introducing gas pressure elsewhere). A second communication path apertures 275 extending from the interior portion 265 of the central member is blocked in the position shown in FIG. 2. The result is that in the position of FIG. 2, there is no fluid communication from the pre-charge portion to any other operative portion of the damper 100 (i.e. the pre-charge is isolated by the central member 250 and the partition 215.

Figure 3:
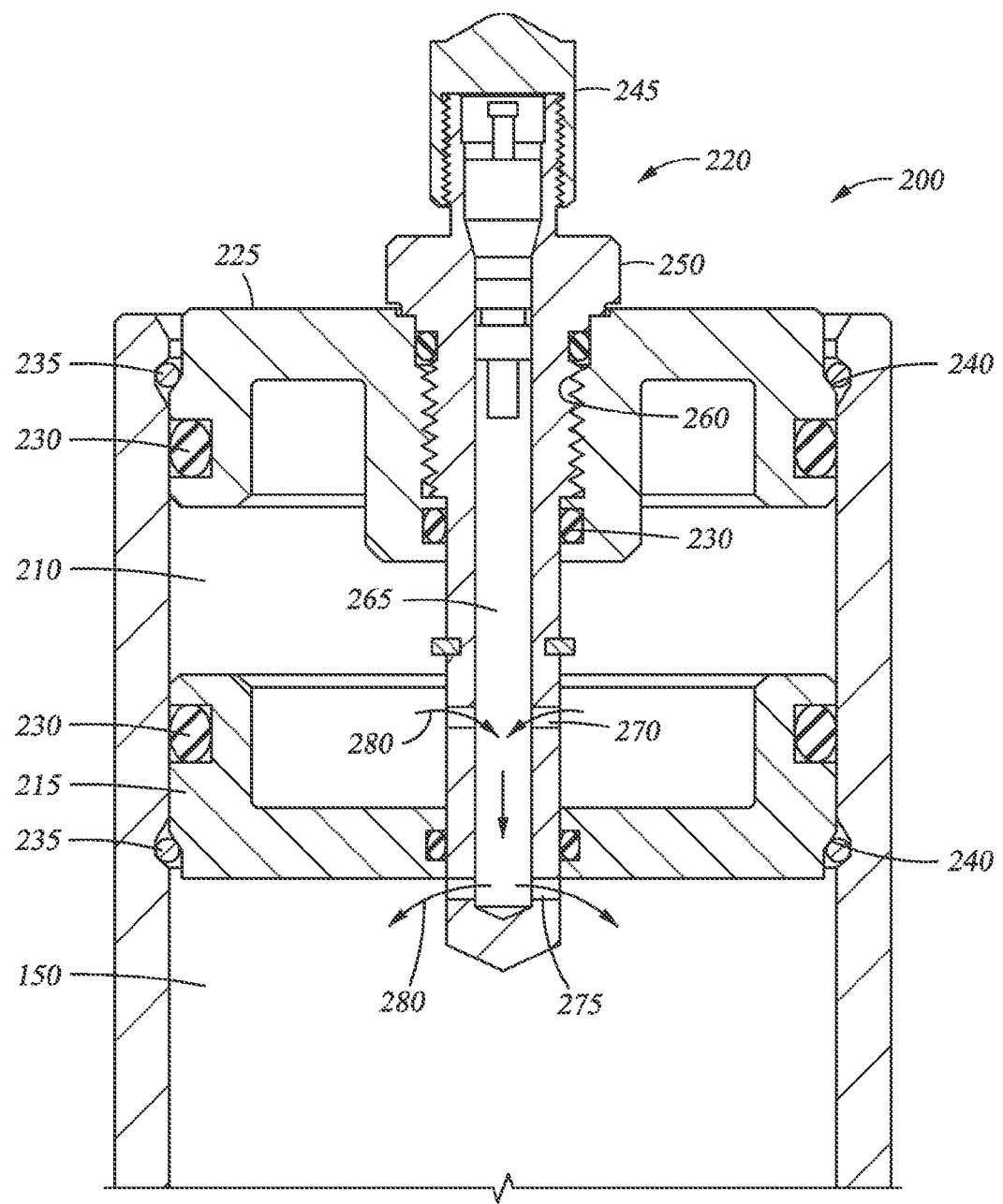
FIG. 3 is a section view of the remote reservoir of FIG. 2, with the pre-charge assembly in a shifted position.

FIG. 3 is another section view of the pre-charge assembly 200 of FIG. 2 showing the central member 250 in a shifted position, whereby fluid communication, illustrated by arrows 280, is permitted between the pre-charge portion 210 and the compressed gas portion 150 of the reservoir 125 (via apertures 270, bore 265 and apertures 275). The pre-charge assembly 200 has been shifted by rotation of the central member 250 to provide axial movement of the fill/communication valve relative to the end cap 225 and relative to the partition 215. In the position shown in FIG. 3, compressed gas flows through the first communication path, through the interior portion 265 of the central member and exiting the second communication path 275 which has been placed into fluid communication with the compressed gas portion 150. Once communication is complete, portions 210 and 125 are combined to effectively form a single larger-volume gas portion at a pressure corresponding to a volume weighted combination of the pressures of the pre-charge and the compressed gas portions.

In one embodiment, partition 215 comprises a rupture disk or frangible membrane. The membrane contains the pre-charge pressure under initial circumstances with the central member in its initial position. In such an embodiment an end of the central member is proximate the partition but does not necessarily penetrate it. The central member includes a relatively sharp end (end near apertures 275) that is capable of piercing the partition upon axial movement of the central member. The central member is axially moved toward the membrane as described herein for in other suitable fashion) and the sharp end of the central member pierces the partition thereby communicating the pre-charge portion gas with the compressed gas portion gas. That results in gas commingling as described herein.

Because the operational reservoir pressure (e.g. the combined pressure of the pre-charge and tile compressed gas portions) is initially isolated from the active portions of the damper, the rod and piston length can be easily adjusted (for example manually) for installation. Once the damper is installed between mounting points in a vehicle, the central member of the fill/communication valve is threaded inwards, placing the second communication path apertures 275 in communication with the compressed gas portion of the damper, thereby permitting gas communication between the portions. In one aspect, the pre-charge assembly 200 is utilized whereby an end user receives a damper with effectively no gas pressure acting upon the floating piston in the remote reservoir and hence no pressure acting on an end area of the piston rod 110. In fact, the gas pressure (a higher pressure designed to be commingled at a lower equilibrium pressure) is all stored in the pre-charge portion 210 of the reservoir. With this arrangement, the piston and rod are easily manipulated back and forth in the fluid chamber which facilitates mounting of the damper relative to mounting locations on the vehicle. Thereafter, the pre-charge assembly is shifted and the damper operates normally utilizing the combined gas portions 210, 125 as a single gas volume.

In one example, the fluid damper is intended to operate with 200 psi in the compressed gas portion of the remote reservoir 125. In one embodiment, 800 psi of pressure is placed into the pre-charge portion. Once the damper is installed and the pre-charge portion shifted, the volume of pre-charge gas at 800 psi commingles with the volume of the compressed gas reservoir at atmospheric pressure resulting in 200 psi is available throughout the reservoir for normal operation in the damper. While the central member 250 is no longer needed to permit or restrict communication between the portions, the fill/communication valve 220 (e.g. Schader type) operates as a fill valve to check and maintain required gas pressure in the remote reservoir 125 throughout the life of the damper.

Figure 4:
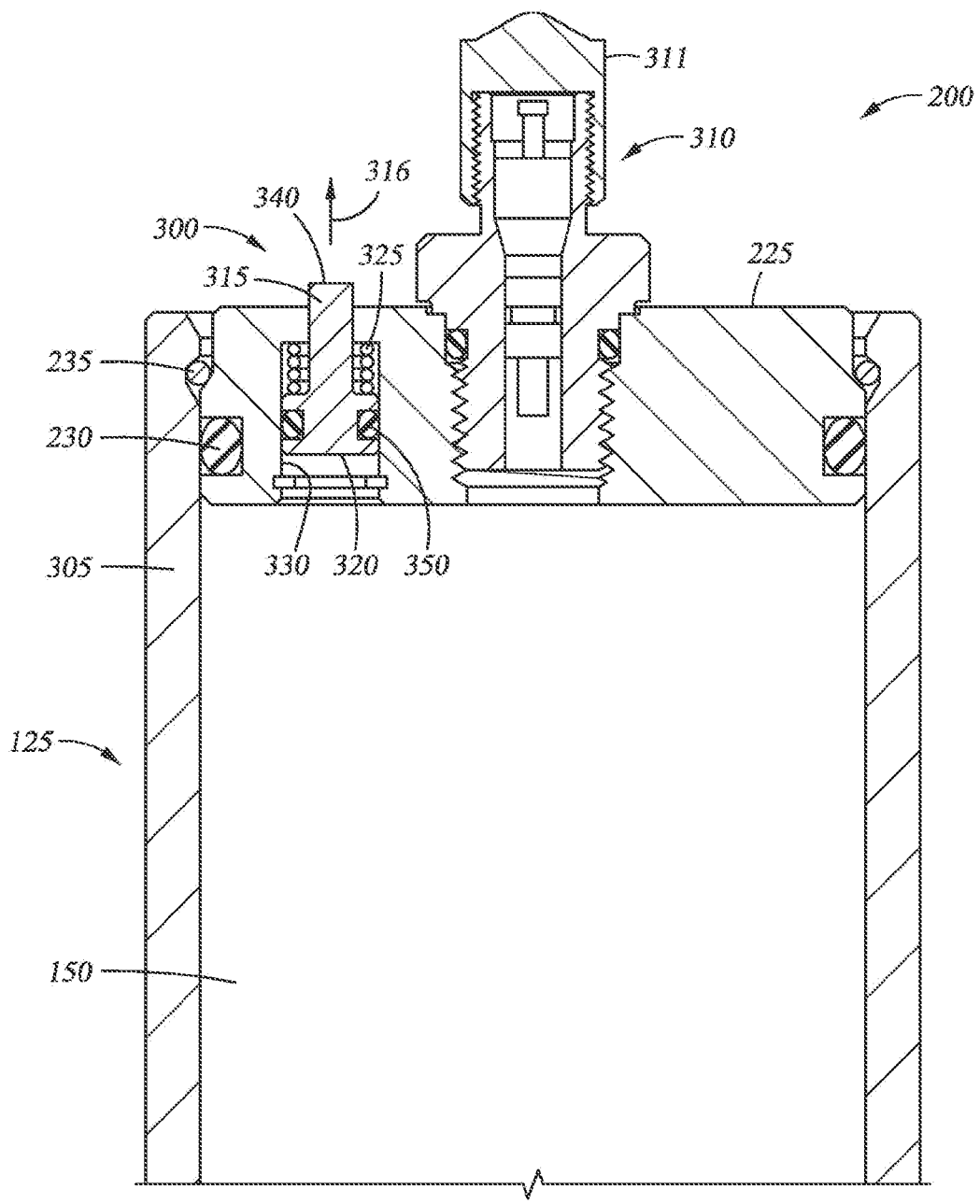
FIG. 4 is a section view of a remote reservoir showing a gas pressure indicator.

FIG. 4 is a section view of a compressed gas portion 150 of a remote reservoir 125 having a gas pressure indicator assembly 300. As described with reference to the other embodiments of the invention, the compressed gas portion 150 shown in FIG. 4 is part of a remote reservoir that operates with a floating piston (not shown) acting against a source of pressurized gas to provide increasing and decreasing volume for fluid displaced from a main fluid-filled dampening chamber. Shown in FIG. 4 is an end of the reservoir housing 305, an end cap 225 that is sealed with O-rings 315 and retained with structural rings 235, a fill valve 310 with a cap 311 for communicating pressurized gas into the compressed gas portion 150 and the gas pressure indicator assembly 300. The purpose of the assembly 300 is to provide a visual indicator of the gas pressure in the gas portion.

Gas pressure indicator assembly 300 includes a shaft 315 with a piston surface 320 formed at a first end and exposed to the interior of the gas portion 150, whereby pressurized gas in the gas portion acts upon piston surface 320. The shaft 315 is sealed in an aperture 330 formed in end cap 225 and sealed with O-ring 230. The shaft and piston surface are biased towards the interior of the housing by a spring 325.

Opposite the piston surface is an indicator 340 constructed and arranged to be visible only when the shaft/piston surface are depressed against the spring 325 hence allowing 340 to extend beyond a surface of cap 225. In use, the assembly 300 is designed whereby the spring 325 is overcome and the piston 320 is depressed when a predetermined pressure exists in the gas portion 150 of the reservoir. Such a position is shown in FIG. 4 with the shaft 315 urged in direction of arrow 316 and the indictor 340 in an extended position where it would be visible to a user. Instead of checking the pressure with a gauge and depleting the gas portion of pressure in doing so (because a pressure gauge requires a volume of the gas being testing and consumes that volume for each test instance), the indicator provides visual assurance of the presence of a certain minimum amount of gas pressure.

Figure 5:
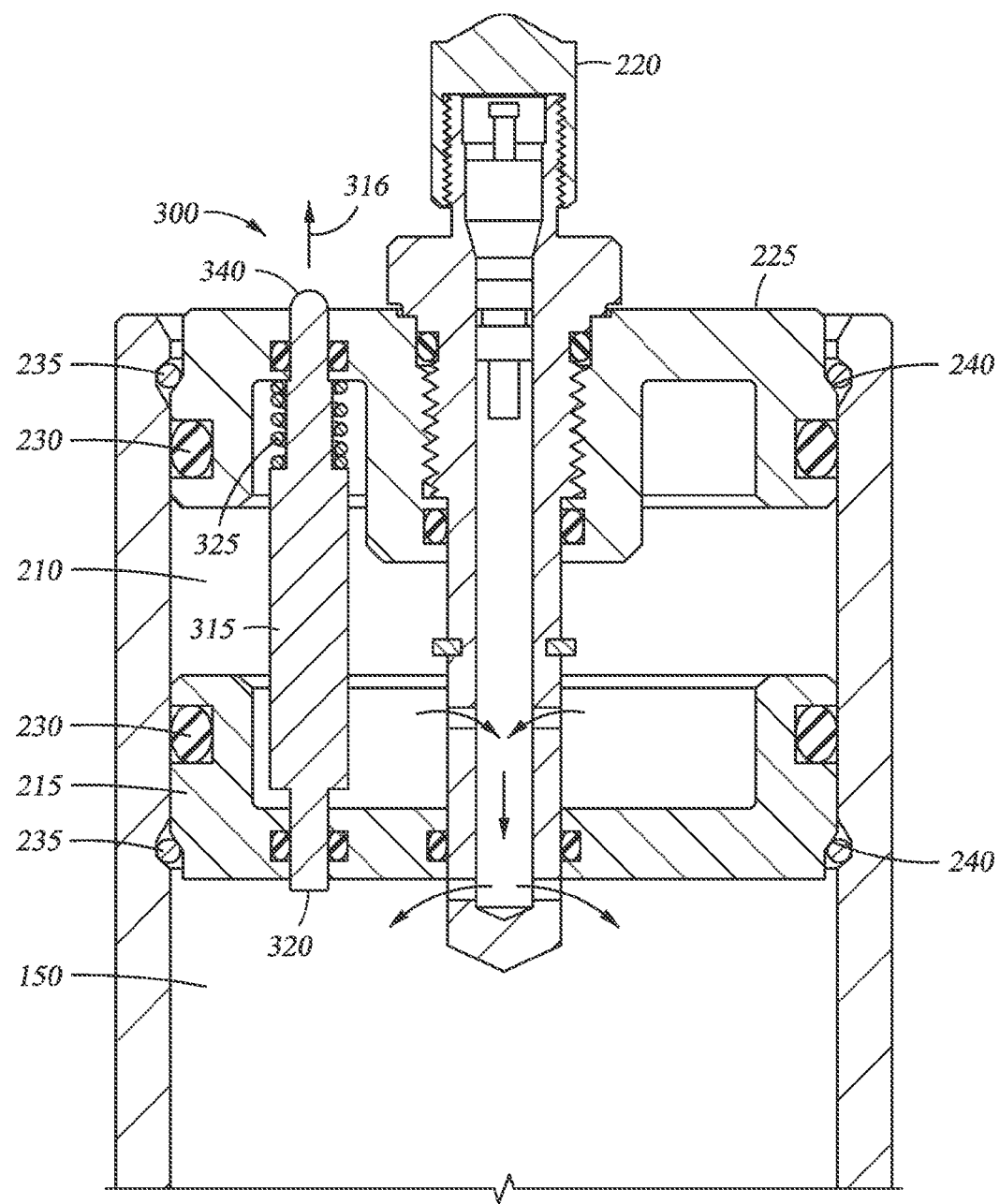
FIG. 5 is a section view of the remote reservoir of FIG. 3 with the pressure indictor incorporated therein.

FIG. 5 is a section view of the remote reservoir 125 of FIG. 3 with pressure indicator assembly 300 incorporated therein. The pre-charge assembly 200 with its pre-charge portion 210 operates as described with reference to FIGS. 1-3 wherein the pre-charge portion retains the working gas pressure until an end user manipulates a fill/communication valve 220 to permit fluid communication between the pre-charge portion 210 and the compressed gas portion 150 (as described herein). Thereafter, the reservoir functions normally with a predetermined gas pressure available in both portions and both portions combined and functioning as one, larger volume compressed gas portion. Also included is the gas pressure indicator assembly 300. In the embodiment shown in FIG. 5, a portion of the shaft 315 including the piston surface 320 is extended to communicate with the compressed gas portion 150 of the reservoir. The pre-charge portion 210 does not act axially on the shaft 315 because the shaft 315 runs entirely though the portion 210 and protrudes through each end with a diameter equal at each end (i.e. no net piston area on shaft 315 vis a vis volume of portion 210). In one embodiment the arrangement shown in FIG. 5 operates as described herein regarding selective commingling of a pre-charge 210 and a gas compression chamber 150. In the embodiment of FIG. 5 the indicator shaft is moved when compressed gas of portion 150 acting on piston area 320 overcomes spring 325 force. As such the indicator provides a visual indication that commingling has been successful following movement of the central member. In this manner, the indicator 340 not only provides a visual indicator of working gas pressure in the reservoir, but is useful in confirming that initial communication has taken place between the portions 210, 150 after manipulation of the central member. In FIG. 5, the pressure indicator 340 is shown in its extended position indicating the presence of at least a minimum amount of pressure in the compressed gas portion 150.

While the foregoing is directed to embodiments of the present invention, other and further embodiments of the invention may be devised without departing from the basic scope thereof, and the scope thereof is determined by the claims that follow.

I claim:

1. A damper for use with a suspension system, the damper comprising:
    a fluid-filled chamber for receiving a piston and rod;
    a reservoir in fluid communication with the chamber, the reservoir having a fluid portion and a compressed gas portion;
    a pre-charge portion separated from the compressed gas portion by a partition, said pre-charge portion enclosing a volume of gas at a pressure greater than a pressure within said compressed gas portion;
    a valve for selectively providing fluid communication between said pre-charge portion and said compressed gas portion; and
    an end cap, wherein said pre-charge portion houses a volume of pressurized gas which is retained between said end cap and said partition, wherein a central member interacts with said end cap, and wherein rotation of said central member provides axial movement of said valve relative to said end cap and relative to said partition.

2. The damper of claim 1, wherein a first end of said central member extends through said end cap.

3. The damper of claim 2, wherein a second end of said central member is located proximate said partition and said second end does not penetrate said partition while said central member is in an initial position, wherein said first end and said second end of said central member are located at opposite ends of said central member.

4. The damper of claim 1, wherein said central member has external threads that interact with internal threads of said end cap.

5. The damper of claim 1, wherein shoulders are formed in said end cap and said partition, and wherein said end cap and said partition are sealed with seals and each of said seals are retained axially by structural rings acting against said shoulders formed in said end cap and said partition.

6. The damper of claim 1, wherein said gas in said pre-charge portion is at a pressure of 600-800 psi while said central member is in the initial position.

7. The damper of claim 1, wherein said compressed gas portion encloses gas at a pressure limited to atmospheric pressure while said central member is in said initial position.

8. A method for facilitating the installation of a damper on a vehicle, said method comprising:
    providing a fluid-filled chamber for receiving a piston and rod;
    providing a reservoir in fluid communication with said fluid-filled chamber, said reservoir having a fluid portion and a compressed gas portion;
    within a pre-charge portion of said damper, pre-charging a gas to a pressure greater than a pressure within said compressed gas portion;
    providing a valve for selectively providing fluid communication between said pre-charge portion and said compressed gas portion; and
    providing said compressed gas portion with a pressure low enough such that a net extension force acting on said piston rod can be overcome manually before said pre-charge portion and said compressed gas portion are in fluid communication.

9. The method as recited in claim 8 wherein said providing a reservoir in fluid communication with said fluid-filled chamber, said reservoir having a fluid portion and a compressed gas portion further comprises:
    providing said compressed gas portion with a pressure limited to atmospheric pressure.

10. The method as recited in claim 8 wherein said pre-charging said gas to a pressure greater than a pressure within said compressed gas portion further comprises:
    pre-charging said gas to a pressure in the range of 600-800 psi.

11. A damper for use with a suspension system, the damper comprising:
    a fluid-filled chamber for receiving a piston and rod;
    a reservoir in fluid communication with the chamber, the reservoir having a fluid portion and a compressed gas portion;
    a pre-charge portion separated from the compressed gas portion by a partition, said pre-charge portion enclosing a volume of gas at a pressure greater than a pressure within said compressed gas portion;
    a valve for selectively providing fluid communication between said pre-charge portion and said compressed gas portion;
    an end cap disposed with said pre-charge portion retained between said end cap and said partition, said end cap enabling operation of said valve; and
    a central member coupled with said end cap, and wherein rotation of said central member provides axial movement of said valve relative to said end cap and relative to said partition.

12. The damper of claim 11, wherein said gas in said pre-charge portion is at a pressure of 600-800 psi.

13. The damper of claim 11, wherein said compressed gas portion encloses gas at a pressure limited to atmospheric pressure.

14. A method for facilitating the installation of a damper on a vehicle, said method comprising:
    providing a fluid-filled chamber for receiving a piston and rod;
    providing a reservoir in fluid communication with said fluid-filled chamber, said reservoir having a fluid portion and a compressed gas portion;
    within a pre-charge portion of said damper, pre-charging a gas to a pressure greater than a pressure within said compressed gas portion;
    providing a valve for selectively providing fluid communication between said pre-charge portion and said compressed gas portion; and
    providing said compressed gas portion with a pressure low enough such that a net extension force acting on said piston rod can be overcome manually before said pre-charge portion and said compressed gas portion are in fluid communication.

15. The method as recited in claim 14 wherein said providing a reservoir in fluid communication with said fluid-filled chamber, said reservoir having a fluid portion and a compressed gas portion further comprises:
    providing said compressed gas portion with a pressure limited to atmospheric pressure.

16. The method as recited in claim 14 wherein said pre-charging said gas to a pressure greater than a pressure within said compressed gas portion further comprises:
    pre-charging said gas to a pressure in the range of 600-800 psi.

* * * * *